United States Patent [19]
Brandt

[11] 3,893,956
[45] July 8, 1975

[54] THIXOTROPIC COATING AGENTS BASED ON UREA ADDUCT OF POLYAMINE AND DIISOCYANATES

[75] Inventor: Dieter Brandt, Eschweiler, Germany

[73] Assignee: August Merckens Nachfolger Kommanditgesellschaft, Eschweiler, Germany

[22] Filed: Dec. 7, 1973

[21] Appl. No.: 422,951

[30] Foreign Application Priority Data
Dec. 11, 1972   Austria .......................... 10493/72
Mar. 28, 1973   Austria ........................... 2741/73

[52] U.S. Cl. ............... 260/18 TN, 260/77.5 CH; 260/77.5 MA, 260/830 P; 260/849; 260/858; 260/859 R; 260/859 PV; 117/161
[51] Int. Cl. ........................................... C08g 22/00
[58] Field of Search ............... 260/18 TN, 77.5 CH, 260/77.5 MA, 858, 859 PV, 830 P, 260/849, 859 R

[56] References Cited
UNITED STATES PATENTS
3,183,109   5/1965   Neumann et al. ............. 260/18 TN
3,547,848   12/1970   Marsh et al. .................... 260/40 TN
3,560,246   2/1971   Payne et al. ........................ 260/858
3,607,822   9/1971   Nishino ............................. 260/858

FOREIGN PATENTS OR APPLICATIONS
1,230,605   5/1971   United Kingdom................. 260/18

Primary Examiner—M. J. Welsh
Attorney, Agent, or Firm—Burgess, Dinklage & Sprung

[57] ABSTRACT

A thixotropic coating agent, more especially a binder of coating composition based on a mixture of conventional binder-containing systems, optionally in admixture with liquid solvents or diluents, and a thixotropizing agent containing urea groups, wherein the thixotropizing agent is, at least in part, a urea adduct obtained by reacting (a) diisocyanate compounds with (b) primary and/or secondary polyamines and, optionally, (c) monofunctional alcohols, oximes and/or amines and/or alkanolamines in the presence of at least part of the binder, using the diisocyanate compound in such quantities that, stoichiometrically, the primary and/or secondary amino groups to not outweigh the isocyanate groups to any appreciable extent.

22 Claims, No Drawings

THIXOTROPIC COATING AGENTS BASED ON UREA ADDUCT OF POLYAMINE AND DIISOCYANATES

Thixotropic coating agents, especially highly thixotropic coating agents based on lacquers, paints or other coatings, can be used with advantage in cases where the application of thick-layer lacquer systems is required. In this connection, the use of thixotropizing agents can also be of crucial significance in obtaining a stable state of admixture in the finished coating agent. Several proposals have already been made for thixotropizing binder-containing coating systems. For example, it is known that coating agents based on drying non-drying fatty oils can be reacted with diisocyanates and heated to high temperatures. According to another proposal, triglycerides of drying or non-drying oils are initially transesterified with polyalcohols and the reaction mixture subsequently reacted with diisocyanates in the presence of catalysts. The diisocyanates and polyalcohols are used in equivalent or substantially equivalent quantities and are required to have a symmetrical molecular structure. According to other proposals, vegetable oils for example are reacted with organic amino compounds, for example aliphatic diprimary amines, to form a thixotropic substance. Thus, it has been proposed to add certain polyamide resins to ester-like lacquer starting materials, followed by boiling, optionally in a multistage process, until thixotropic properties appear.

It is known from German Auslegeschrift 1,805,693 that coating agents based on a mixture of a solventcontaining lacquer or a paint with conventional binders can be thixotropized by the addition of 0.05 to 10% by weight of a urea adduct obtained by reacting an aliphatic monoamine with 6 to 22 carbon atoms with an aromatic or aliphatic monoisocyanate or polyisocyanate in an organic solvent, the molar ratio of amine to isocyanate lying between the stoichiometric ratio and a 40% excess of amine. More particularly, German Auslegeschrift 1,805,693 proposes initially preparing a gel in a separate process, comprising reacting the isocyanate compounds with the specified monoamines in a lacquer solvent, and subsequently working this gel into the binder-containing coating agent. However, the specified urea adduct can also be prepared in situ in the presence of the binder.

The practical requirements which a thixotropizing agent or a thixotropic coating system has to satisfy are manifold and, for this reason, are difficult to satisfy at one and the same time. In thixotropizing coating agents, it is of course not only a question of thickening a coatable system, on the contrary a whole range of special properties is required. Thus, the thixotropized system is required to be readily stirrable or spreadable, inspite of its gel character, whilst on the other hand the gel-like character is required to be reformed almost instantaneously once the effect of mechanical stressing has been removed. In the fresh thick-layer coating, the freshly applied layer of coating agent is required to level to a certain extent in order to equalise irregularities in the coating by free flow. On the other hand, fresh thick-layer thixotropic coatings are in danger of "running," especially when applied to vertical walls. Particular problems arise in cases where coating agents contain heavy pigments, for example iron mica, as is the case in particular with anti-corrosion coatings. However, it is in this very field that there is an increasing demand for effective thixotropic coating agent systems in order to simplify and shorten the extremely labour-intensive work involved in the protection of large steel structures.

The object of the invention is to provide a thixotropizing agent or thixotropic binders and, hence, thixotropic coating agents which are distinguished by a wider range of variation in their combination of properties than it has been possible to obtain with certain conventional thixotropizing agents.

In broad terms, this object is achieved by reacting primary and/or secondary polyamines, i.e. amine compounds containing at least two of the aforementioned amino groups, with diisocyanates, the isocyanate-reactive amino groups being stoichiometrically comparable in number, i.e. not out-numbering to any appreciable extent, the isocyanate groups available for the reaction. The diisocyanate compounds are preferably used in at least such quantities that the total number of isocyanate groups present and the primary or secondary amino groups reactive with isocyanate groups are stoichiometrically substantially equivalent. However, it is particularly preferred in accordance with the invention to use the diisocyanates in excess. In this case, it is particularly preferred, by using certain monofunctional compounds, to arrest the excess of still free isocyanate groups with these monofunctional components. By varying the ratio of polyamine to the monofunctional compounds and the total quantity of diisocyanate compound used, it is possible in accordance with the invention to provide the thixotropic coating agent specifically with a wider range of desirable properties than can be achieved with conventional thixotropizing agents. Another essential feature of the invention is that the urea adduct is prepared in the presence of at least part of the binder.

Accordingly, a first embodiment of the invention relates to thixotropic coating agents, especially binders or coating compositions based on a mixture of conventional binder-containing systems, optionally in admixture with liquid solvents or diluents and a thixotropizing agent containing urea groups, distinguished by the fact that the thixotropizing agent is, at least in part, a urea adduct obtained by reacting (a) diisocyanate compounds with (b) primary and/or secondary polyamines and optionally (c) monofunctional alcohols, oximes and/or amines and/or alkanolamines in the presence of at least part of the binder, using the diisocyanate compound in such quantities that, stoichiometrically, the primary and/or secondary amino groups do not outweigh the isocyanate groups to any appreciable extent.

The thixotropic coating agents according to the invention can be complete coating agents in the forms of lacquers, paints, varnishes or synthetic coatings, although the invention also covers in particular thixotropized binders and binder-solvent systems. Thixotropic binders of this kind can be directly used by the manufacturer of the complete coating agent to prepare ready-to-use thixotropic coating agents.

According to the invention, the polyurea adduct used as thixotropizing agent is present in a quantity of preferably 0.05 to 10% by weight, more especially in a quantity of about 0.1 to 5% by weight, based on the thixotropized system.

Another embodiment of the invention relates to a process for producing thixotropic coating agents, more especially binders or coating compositions, of this kind, distinguished by the fact that a liquid binder or a binder-containing liquid mixture is thoroughly mixed with the primary and/or secondary polyamines and, optionally, with the monofunctional components and alkanolamines, and the resulting mixture subsequently reacted with the diisocyanates.

Particularly preferred embodiments of this process will now be described.

Through the formation of a polyurea system, a more or less heavily developed thixotropic effect occurs in many cases almost at once or after a certain period of standing, for example after about 24 hours. The extent of this thixotropic effect can be predetermined in any one case by simple small-scale tests. A wide variation of combined property characteristics can be determined in advance and standardised by adapting the quantities of components selected for forming the thixotropizing agent and optionally by selecting and using particularly appropriate binder systems.

To form the thixotropizing agent according to the invention, the polyamine is preferably used in a quantity of from 5 to 120 equivalent % of reactive primary and/or secondary amino groups, based on isocyanate groups. Isocyanate groups and reactive amino groups are combined at most in an equivalent ratio, especially in cases where the presence of free amino groups in the finished coating agent is undesirable. According to the invention, it is as a rule particularly preferred to use an excess of isocyanate groups over reactive amino groups. Thus, quantities of polyamine in the range from 5 to 100 equivalent % and, more particularly, in the range from about 10 to 70 equivalent % of primary and/or secondary amino groups, based on isocyanate groups, are particularly suitable for the purposes of the invention.

In cases where an excess of reactive isocyanate groups over the reactive amino groups of the polyamine is used, the monofunctional components and alkanolamines, which in turn can react with isocyanate groups, are used at least in a quantity equivalent to the still free isocyanate groups. With an excess of isocyanate groups, otherwise free isocyanate groups would remain behind in the binder or coating agent where they could give rise to undesirable secondary reactions. Accordingly, it is preferred in accordance with the invention to block this quota of free isocyanate groups by using monofunctional isocyanate-reactive components. Monofunctional amines and monofunctional alcohols or monofunctional oximes can be used for this purpose. One particular example of monofunctional amines are alkanolamines which actually contain two isocyanate-reactive groups. However, on account of the considerably increased reactivity of the amino group, these groups will always react first with any isocyanate groups still present so that an additional reaction of the hydroxyl groups of the alkanolamine could only be considered if, after all the amino groups have been consumed, there are still some free isocyanate groups which have not been arrested by other reaction components in the meantime. In fact, it is preferred in accordance with the invention to use even the alkanolamines themselves as monofunctional components.

In the context of the invention, polyamines are primary and/or secondary amines which contain at least two of these isocyanate-reactive amino groups. Diamines, especially diprimary amines (primary diamines), can be used with particular advantage. In addition to or instead of these diamines, however, it is also possible to use tri- and higher polyamines. According to the invention, however, it is preferred only to use these higher polyamines in admixture with diamines, for example in such ratios that substantially equivalent quantities of diamine and higher polyamine are present.

Examples of higher polyamines include diethylene triamine to pentaethylene hexamine, or dipropylene triamine to pentapropylene hexamine. The reactive diamines particularly preferred for the purposes of the invention can be cycloaliphatic and/or aromatic and, at the same time, optionally polynuclear, although it is also possible, either wholly or in part, to use aliphatic diamines.

Polyamines with which favourable results have been obtained in accordance with the invention are, for example, 3,3'-dimethyl-4,4'-diaminodicyclohexyl methane, 4,4'-diaminodicyclohexyl methane, 4,4'-diaminodiphenyl methane, ethylene diamine, N-aminoethyl piperazine, xylylene diamines, 1,3,5-triisopropylbenzene-2,4-diamine, 1,3-diisopropylbenzene-2,4-diamine, 2,4-diaminomethyl-1,3-dimethylbenzene or 3-aminomethyl-3,5,5-trimethylcyclohexylamine.

In many cases, the use of polyamines alone gives rise to the formation of gels that are relatively difficult to destroy, i.e. difficult to spread, unless special measures are taken. However, in combination with the monofunctional isocyanate-reactive compounds, it is readily possible to modify the required gel properties and to standardise them in advance.

Suitable diisocyanate compounds include both aromatic and cycloaliphatic, optionally polynuclear diisocyanates and/or aliphatic diisocyanates. Examples of suitable commercially available compounds of this class include aliphatic diisocyanates with at least two carbon atoms, such as ethylene-1,2-diisocyanate and hexamethylene-1,6-diisocyanate or an isomer mixture of 2,2,4- and 2,4,4-trimethylhexamethylene diisocyanate. Aromatic diisocyanate compounds are particularly suitable, for example the known isomer mixtures of 65% of tolylene-2,4-diisocyanate and 35% of tolylene-2,6-diisocyanate, and isocyanate mixtures containing 80% of the 2,4-isomer and 20% of the 2,6-isomer. Other suitable aromatic diisocyanates include diphenylmethane-4,4'-diisocyanate or naphthylene-1,5-diisocyanate. 3-Isocyanatomethyl-3,5,5-trimethylcyclohexyl isocyanate is one example of a cycloaliphatic diisocyanate suitable for the purposes of the invention.

All the reactive diamino compounds and diisocyanates mentioned here are suitable for thixotropizing. 3,3'-Dimethyl-4,4'-diaminodicyclohexyl methane, xylylene diamine and 4,4'-diaminodiphenyl methane, are particularly effective.

Among the isocyanates, diphenylmethane-4,4'-diisocyanate, tolylene-2,6-diisocyanate and naphthylene-1,5-diisocyanate in particular show pronounced thixotropic effects. In this case, too, however, all the described diisocyanates are basically suitable. The only difference between them lies in their effectiveness. Allowance can be made for this difference in selecting the quantity of polyurea-forming components. Thus, it is possible by selecting a larger quantity of components with a weaker action to obtain a thickening effect equivalent to that obtained by using smaller quantities of components with a stronger thixotropic action.

Substantially the same thixotropic effect is obtained when, for example, the isomer mixture of 2,2,4- and 2,4,4-trimethyl hexamethylene diisocyanate is reacted with 3-aminomethyl-3,5,5-trimethylcyclohexyl amine, or the isomer mixture of 2,2,4- and 2,4,4-trimethyl hexamethylene diamine with 3-isocyanato methyl-3,5,5-trimethylcyclohexyl isocyanate in the presence of a binder.

In the case of aliphatic diisocyanates, symmetry in structure has a positive effect in regard to their effectiveness as thixotropizing component. For example, hexamethylene-1,6-diisocyanate is more effective than 2,2,4- or 2,4,4-trimethylhexamethylene-1,6-diisocyanate.

It has also been found that alkyl groups in particular, such as methyl and isopropyl radicals as substituents in the vicinity of the NCO-group, i.e. in the o-position, have a particularly favourable effect upon the thixotropizing properties of aromatic diisocyanates. If two methyl or isopropyl groups are symmetrically adjacent the isocyanate groups, the effect of the diisocyanate becomes even more favourable. 1,3,5-Triisopropylbenzene-2,4-diisocyanate for example shows the most pronounced thixotropizing properties. The effect of 1,3-diisopropylbenzene-2,4-diisocyanate, tolylene-2,6-diisocyanate, 2,4-diisocyanatomethyl-1,3dimethylbenzene is not quite so strong, whilst tolylene-2,4-diisocyanate and hexamethylene-1,6-diisocyanate have an even somewhat weaker thixotropizing effect.

A certain parallel can be found amongst diamines. 3,3'-Dimethyl-4,4'-diaminodicyclomethane is significantly more effective than 4,4'-diaminodicyclohexyl methane, whilst o-phenylene diamine is significantly more effective than m- and p-phenylene diamine which produce equivalent thixotropic binders.

Secondary diamines of aliphatic structure which do not contain any primary amino groups have to be used in extremely high concentrations to obtain even a weak thixotropic effect. Ethylene diamine for example provides a strong thixotropic effect, whereas the corresponding N,N'-diethyl derivative is considerably less effective. By contrast, heterocyclic diamines with secondary amino groups only, for example piperazine, are extremely effective. This diamine is as effective as 3,3'-dimethyl-4,4'-diamino dicyclohexyl methane.

So far as aliphatic diamines are concerned, it can generally be said that not only do short-chain diamines provide particularly favourable effects, long-chain diamines, for example 1,12-diaminododecane, are also valuable components in accordance with the invention. Tri- and higher polyamines suitable for the purposes of the invention include in particular aliphatic polyamines with 3 to 6 amino groups in the molecule, of which the terminal groups are primary amino groups and the rest secondary amino groups.

Monoalcohols in the context of the invention are in particular adequately volatile monofunctional alcohols of aliphatic and/or cycloaliphatic structure. Aliphatic monoalcohols with 1 to 7 carbon atoms and cycloaliphatic lower alcohols, especially cyclohexanol, are particularly suitable. It is also possible to use alcohols of higher molecular weight. In their case, however, one factor which has to be taken into consideration is that, as a rule, the alcohols can be used in almost any excess so that, in most cases, a considerable proportion of the alcohols does not take part in the reaction by which the thixotropizing agent is formed. Accordingly, it should be possible for this alcohol excess to be able to be evaporated from the binder or from the paint produced with it so that it does not leave behind any adverse effects upon the properties of the binder or paint. In addition to the aforementioned monoalcohols, it is also possible to use lower ether alcohols in particular monoethers of glycols. Examples include methyl-, ethyl-, propyl- or butyl-glycol monoether, and the corresponding semiesters of glycols.

Similar considerations affect the choice of the oximes as monofunctional reaction components. In this case, volatile or evaporating components are preferred, ketoximes and aldoximes containing up to 6 carbon atoms being particularly suitable.

Both the monoalcohols and also the oximes can be used in a considerable excess over the quantity required for blocking free isocyanate groups. This generally does not apply in cases where monoamines are used because the monoamine is preferably employed in only such a quantity that no appreciable numbers of free amino groups are present after formation of the urea adduct. Although bascially it is possible to use an excess of monoamine, this generally does not produce any improvement in thixotropy. In the case of binders which dry by oxidation, an excess of free amino groups can be harmful, resulting in particular in much slower drying. Suitable monoamines are, in particular, primary monoamines of aliphatic, cycloaliphatic and heterocyclic structure. Compounds containing 1 to 25 or even more carbon atoms can be considered. Secondary monoamines of aliphatic or cycloaliphatic structure, for example dibutylamine or dicyclohexyl amine, are also suitable for arresting the still free isocyanate groups. However, monoamines of this kind have little or no effect in increasing thixotropy, whereas primary monoamines may even develop their own effect.

Among the class of alkanolamines, it is possible to use alcohols containing primary or secondary amino groups. The general principles stated above apply in this case, too, especially as regards the amino group, namely that no appreciable excess over the NCO-groups ready for reaction should be used. Lower aliphatic alkanolamines in particular are especially significant for practical application.

It is of particular advantage to the invention that the reaction velocity between isocyanate groups and amino groups is several times higher than the reaction velocity between isocyanate groups and hydroxyl groups, as present in particular in the monoalcohols. The urea group important for development of the thixotropic effect is always formed even in cases where the binder-containing system contains solvents with hydroxyl groups and in cases where a mixture of polyamines and compounds containing hydroxyl groups is added to the binder system. When the diisocyanate is added, the components with primary and/or secondary amino groups present in the reaction mixture will always react first with the isocyanate groups so that the excess of isocyanate groups can subsequently be eliminated in a following, slower reaction accompanied in particular by the formation of urethane groups. Thus, it is possible, inter alia by varying the ratios of monofunctional to polyfunctional components, to control the properties of the gels obtained in such a way that they correspond optimally to the particular requirements of any one individual case.

In general, the viscosity of the binder or binder-containing system is reduced in cases where solvents containing hydroxyl groups are used for thixotropizing in accordance with the invention. This makes it easier to prepare the thixotropizing agent in the presence of the binder. The same applies in cases where the binders are dissolved in non-reactive solvents, for example in aliphatic or aromatic hydrocarbons, esters, ketones, ethers and the like. However, the coating agents according to the invention are generally distinguished by considerable binder contents. Thus, the binder is preferably present in the thixotropized system in a quantity of at least 20% by weight. It may be of advantage to use even larger quantities of binder in the system, for example at least 30% by weight or 40% by weight or more. In important applications of the invention, the binder makes up more than half the total mixture.

Suitable binders include almost all the components that have already been proposed in the coating art. A thixotropizing effect can be obtained in almost every case. Examples of particularly suitable binders include long-oil, middle-oil or short-oil or even oil-free alkyd resins, stand oils, linseed oil/linseed oil-stand oil combinations, urethane-, epoxy resin-, acrylic resin- and styrene-modified alkyd resins, PVC-copolymers, cyclorubbers, oil-modified epoxides, water-dilutable alkyd resins in their non-neutralised form and similar components.

However, the invention can also be applied with advantage for example in the case of unsaturated polyester resins or mixtures thereof with copolymerisable monomers, such as styrene, methacrylate or similar ethylenically unsaturated compounds. Another interesting field of application for the invention are the so-called solvent-free binder systems, i.e. comparatively low-viscosity condensates which are used without, or only with small quantities of, solvents. Suitable acid binders in nonneutralised form are, for example, binders of this kind with acid numbers of from 20 to 120, preferably from about 30 to 90. However, the system according to the invention is also suiable for thixotropizing water-dilutable binders which are neutralisation products or at least partially neutralised products of binders which, in their non-neutralised form, have an acid number of 20 to 120, preferably 30 to 90. From the extensive prior art on the quality of binders, reference is made to British Pat. No. 1,230,605 and the literature quoted therein, and to the book by Wagner-Sarx "Lackkunstharze," fifth Edition, 1971, Carl Hanser Verlag, Munich.

Individual binders can respond differently to the thixotropizing effect. If it is desired to intensify the effect of binder systems having only a weak response in thixotropizing according to the invention all that is necessary is for example to use limited quantities of a compatible and, at the same time, high-response binder in order overall to obtain a highly thixotropic composition.

In another embodiment of the invention, it is possible to thixotropize only part of the binder of the finished composition in the presence of the reactive components of the invention. In this embodiment, exaggerated thixotropy is obtained in regard to this part of the binder. The gel thus obtained is subsequently mixed with non-thixotropized binder and/or solvent or diluent until the required state is reached. This possibility embodies another important simplification for adjusting predeterminable property combinations in the end products.

Well developed thixotropic properties and, in most cases, clear gels are obtained by initially introducing the diamine into the binder and subsequently adding the diisocyanate optionally diluted with solvent. According to one particularly important aspect of the invention, however, the thixotropizing agent is obtained by a sequence of certain process stages.

In this embodiment, not only is the polyamine together with the monofunctional components present, if any, mixed with a binder before polyurea formation, the diisocyanate is also preferably combined with part of the binder or binder-containing mixture before the components are reacted.

In the particularly important embodiment referred to above, the reaction is carried out by homogeneously distributing the diisocyanates in part of the liquid binder or binder-containing liquid mixture and subsequently introducing the polyamines, again best dissolved in binder, into the diisocyanate immediately afterwards. This ensures that isocyanate groups are present in excess at least during the greater part of the urea-forming reaction. It can be of particular advantage for this purpose to establish an excess of isocyanate during selection of the stoichiometric ratio of reactive amino groups and isocyanate groups, so that free isocyanate groups are present in excess up to the end of the reaction of the amino groups. A considerable excess of for example 10 isocyanate groups to 2 to 7, preferably 4 to 6, reactive amino groups can be of advantage here. The isocyanate groups that are not arrested by amino groups are reacted with the monofunctional components also used in this case.

The special addition of the polyamine to the diisocyanate excess, as described above, results in the formation of thixotropic materials which, hitherto, it has not been possible to obtain in the combination of their favourable properties. The thixotropized coating agent or binder has a soft-pasty consistency, i.e. it is easy to spread. Nevertheless, it does not run, even in thick layers, when applied to vertical surfaces. On the other hand, this soft-pasty material levels to an adequate extent so that irregularities arising out of application of the coating agent to the substrate to be coated are satisfactorily equalised in the required manner. Thixotropized coating agents prepared in this way are clearly distinguished in the particularly advantageous combination of their properties from those in whose case the diisocyanate is introduced into the polyamine-containing reaction component.

Reaction of the polyamines with the diisocyanate compounds and, optionally, the monofunctional components in the presence of the binder can be carried out at room temperature. However, the effect of the thixotropizing additive can be considerably increased in many cases by carrying out the reaction at elevated temperatures. Temperatures in the range from about 40° to 100°C are particularly suitable for this purpose, temperatures in the range from 50° to about 80°C being particularly preferred. Another possiblity for intensifying the effect of the gel is to carry out the reaction at room temperature and subsequently to heat the thixotropized material for example to temperatures of up to about 80°C. Temperatures in the range from room temperature to about 100°C, more particularly in the range from room temperature to about 70°C, are generally suitable for preparation of the polyureas. The thixotropic gel formed in the presence of binders is remarkably stable and, in particular, represents an irreversible gel largely unaffected by temperature.

This resistance of the thixotropic state to temperature, even high temperatures such as those normally applied for stoving purposes, makes the invention particularly suitable for use in the field of heat-drying or heat-reactive binders and coating systems. Accordingly, one particularly preferred aspect of the invention is the use of the addition products containing urea groups prepared in the presence of polymeric compounds as heat-stable thixotropizing agents in heat-drying polymer compositions, for example in so-called stoving lacquers.

One particularly interesting field of the kind in question here is the production of heat-hardened coatings on metal components for example by applying so-called heat-drying lacquers and, in particular, stoving lacquers and primers. These processes are widely used in industry, for example in the manufacture of car bodies, domestic appliances, such as washing or rinsing machines, refrigerators or in the production of so-called band coatings by the coil-coating technique. Industry has developed a large number of thermosetting systems which are normally hardened at temperatures of from about 70° to 300°C or even higher. The invention is particularly suitable for this field of heat-reactive coating agents, more especially heat-drying lacquers, stoving lacquers and primers based for example on thermosetting aminoplasts, autocrosslinking or crosslike-assisted acrylate resins, thermosetting alkyd resins and/or epoxide resins. The heat-reactive binder systems mentioned here can be used as known per se in admixture with other binder components, as known from the numerous proposals for the production of heat-hardenable systems. Among the extensive literature, reference is made in this connection to "Ullmann's Enzyklopadie der Technischen Chemie," third Edition, Urban und Schwarzenberg, vol. 11, pages 279 to 364, and to the already mentioned book by Wagner-Sarx entitled "Lackkunstharze," in particular pages 61 to 80 and 230 to 235.

The invention can be of particular importance in the field of thermosetting stoving lacquers based on aminoplasts, more especially corresponding urea resins and/or melamine resins. The multicomponent lacquers plasticised by the addition of other binder systems are of particular importance in this respect. Plasticising systems of this kind are, for example, polyesters, drying or non-drying alkyd resins, epoxide resins, polyacrylates, also nitrocellulose or silicone-, acryl-, styrene-, vinyltoluene-modified alkyd resins or even oil-free alkyd resins.

The mixing ratios of the polymeric binders lie within the usual limits. Accordingly, the thermosetting, more especially etherified urea or melamine resin is preferably used in a deficit in relation to the other constitutents of the binder.

It has proved to be of advantage in this very field of aminoplast-based stoving lacquers for the various process stages involved in the production of the thixotropized material to follow a certain order. Thus, it is of particular advantage to carry out in situ production of the urea adduct from isocyanate compounds and amines in the plasticising binder component rather than in the aminoplast component. The aminoplasts can readily show incompatibility with urea adducts if an attempt is made to carry out in situ formation of the urea in the aminoplast phase. This gives rise to hazing phenomena which may be attributable to some precipitation of the polyurea molecule formed and the effect of which can be that the thixotropic effect is not fully developed. Accordingly, it is more effective to carry out in situ formation of the urea adduct in the plasticising binder component and subsequently to mix the binder thixotropized in this way with the heat-reactive aminoplast component. In this way, the thixotropic effect is no longer impaired.

In addition, the invention is of particular importance in connection with acrylate resins both of the autocrosslinking and of the crosslink-assisted type. Both types can be satisfactorily thixotropized by in situ formation of urea adduct in their presence so that they can be used either as such or in admixture with components introduced into them, for example alkyd resins and/or other binder components as listed above, as binding phase for the thixotropizing agent. The autocrosslinking acrylate resins can be mixed for example in known manner with epoxide resins, alkyd resins or melamine resins, whilst the crosslink-assisted acrylate resins require in particular products containing methylol ether, such as urea resins or melamine resins, as stoving lacquers.

In cases where binders according to the invention containing methylol ether groups are directly thixotropized, it can be of advantage to bear the following in mind: binders of this kind, such as amino resins or acrylamide-formaldehyde resins can obviously interact with the amines used to form the urea adduct. Accordingly, it is advisable in this and similar cases to add the isocyanates immediately after the binder has been mixed with the amines. By virtue of the particularly high reactivity of the isocyanate group with the amino groups, the urea adduct is formed before undesirable secondary reactions or interactions can occur.

In selecting the components for forming the urea adducts, it can be of advantage, especially in accordance with the stoving conditions required later on, to take into account colour stability in dependence upon the stoving temperature. It is known, for example from polyurethane chemistry, that aromatic diisocyanates, such as tolylene diisocyanate, can give rise at elevated temperatures to undesirable changes in colour reflected in the form of yellowing in the field of stoving lacquers in question here. Accordingly, in cases where high colour stability, especially at high temperatures, is required, it can be of advantage to use non-aromatic diisocyanates, for example cycloaliphatic and, in particular, aliphatic diisocyanates.

In one preferred embodiment of the invention, substantially anhydrous conditions are applied at least up to formation of the urea adduct involving reaction of all the isocyanate groups. The quantities of moisture normally prsent in the components of the coating agent are harmless in this embodiment. In fact, formation of the urea adduct can even be carried out in the presence of relatively small or relatively large quantities of water. In this case, it is necessary to ensure, preferably by rapidly mixing isocyanate and amine component, that the reaction between these two reactive groups is the preferred reaction.

According to the invention, it is readily possible to thixotropize not only binders as such or their solutions, but also complete paints which, in addition to the binder, contain pigments and additives for example.

In this case, the two reactants are added to the finished paint. However, it is more favourable to thixotropize the binder alone or in admixture with a solvent or diluent, and subsequently to process the gel formed with the pigments and other additives, for example by grinding on a roll stand, in a bead mill or in a dissolver, to form the paint.

Typical recipes for the preparation of thixotropizing agents according to the invention are given in the following. So far as this first group is concerned, the constituents of component 1 are initially mixed thoroughly together and component 2 subsequently added slowly with stirring to component 1. The quantity in which component 2 is used should be selected on the basis of the teaching behind the invention so that the isocyanate groups at least substantially correspond to the amino groups of the polyamine, but are preferably present in excess. A val is defined as the quantity of material in grams which corresponds to the molecular weight of the polyfunctional compound divided by the number of functional groups.

1. First basic recipe

Component 1
 300 parts by weight of binder solution or solvent-free
 0.005 to 0.15 val of diamine
 0.005 to 0.15 val of monoamine (useable in up to twice the equivalent quantity)
Component 2
 0.010 to 0.30 val of diisocyanate

2. Second basic recipe

Component 2
 300 parts by weight of binder solution or solvent-free
 0.005 to 0.15 val of diamine
 0.005 to 0.15 val of monoalcohol (useable in up to 10 times this theoretical quantity, but preferably in 2 to 5 times the equivalent quantity)
Component 2
 0.010 to 0.30 val of diisocyanate

3. Third basic recipe

Component 1
 300 parts by weight of binder solution or solvent-free
 0.005 to 0.15 val of diamine
 0.005 to 0.15 val of ketoxime or aldoxime (useable in up to twice the equivalent quantity)
Component 2
 0.010 to 0.30 val of diisocyanate Component 2 is slowly added with stirring to Component 1.

In these three basic recipes, the monofunctional components are separately specified. They can of course also be present in any mixtures with one another.

Basic recipes for the particularly preferred working direction followed in the production of the urea adduct, in which a solution of the polyamines and the monofunctional compounds used, if any, in the finder system is added to a freshly prepared solution of the diisocyanates in a fraction of the binder, are the following:

In the following Examples, the quality of the thixotropic state was assessed according to three aspects, namely the thixotropy adjusted, the viscosity developed and the flow properties of the product. The marks awarded are defined as follows:

thixotropy:
 6 = very heavily thixotropic
 5 = heavily thixotropic
 4 = satisfactorily thixotropic
 3 = weakly thixotropic
 2 = very weakly thixotropic
 1 = non-thixotropic
viscosity:
 4 = very difficult to stir
 3 = difficult to stir
 2 = satisfactorily stirrable
 1 = readily stirrable
flow properties:
 4 = heavily ointment-like, pasty
 3 = ointment-like, pasty
 2 = weakly ointment-like, pasty
 1 = non-ointment-like, pasty Table 1

| | | 1 | 2 | 3 | 4 | 5 | 6 |
|---|---|---|---|---|---|---|---|
| Component 1) | | | | | | | |
| | middle-oil air-drying alkyd resin, 55% in white spirit | 300.0 | 300.0 | | | | |
| | long-oil linseed oil alkyd, 60% in white spirit | | | 300.0 | 300.0 | 300.0 | 300.0 |
| Component 2) | | | | | | | |
| | ethylglycol | 10.0 | 10.0 | 11.7 | 30.0 | 20.0 | 30.0 |
| | 3,3'-dimethyl-4,4'-diaminodicyclohexylmethane | 2.5 | 1.0 | 2.5 | 2.5 | 4.5 | 5.0 |
| Component 3) | | | | | | | |
| | tolylene diisocyanate | 4.7 | 5.0 | 4.7 | 4.7 | 6.4 | 6.5 |
| | white spirit | 20.0 | 20.0 | 20.0 | 20.0 | 20.0 | 20.0 |
| thixotropy | | 5 | 3 – 2 | 3 | 2 | 3 | 6 |
| viscosity | | 2 | 2 | 2 | 2 – 1 | 2 | 2 |
| flow properties | | 2 – 3 | 2 – 3 | 2 | 2 | 3 – 2 | 2 |
| | | opalescent, hazy | opalescent, hazy | almost clear | slightly hazy | slightly hazy | clear |

| 7 | 8 | 9 | 10 | 11 | 12 | 13 |

Table 1—Continued

|  |  | 1 | 2 | 3 | 4 | 5 | 6 |
|---|---|---|---|---|---|---|---|
| Component 1) | | | | | | | |
| | epoxide ester 50% in xylene | 300.0 | 300.0 | | | | |
| | long-oil linseed-oil alkyd, 60% in white spirit | | | 300.0 | 300.0 | 300.0 | 300.0 | 300.0 |
| | butanone oxime | | | | | | 3.0 | 5.0 |
| | dipropylene triamine | | | | 4.0 | 2.0 | 2.0 | 2.0 |
| | cyclohexylamine | 6.0 | | | | 2.0 | | |
| | pentapropylenehexamine | 3.0 | 1.33 | 1.05 | | | | |
| | ethylglycol | | 16.50 | | 20.0 | 20.0 | | |
| | stearylamine | | | 8.10 | | | | |
| Component 2) | | | | | | | | |
| | tolylene diisocyanate | 18.0 | 13.30 | 5.2 | 13.0 | 10.0 | 10.0 | 10.0 |
| | xylene | 60.0 | | 20.0 | 20.0 | | | |
| thixotropy | | 4 | 5 – 4 | 2 | 6 | 5 | 3 | 3 |
| viscosity | | 2 | 4 | 2 | 2 – 3 | 3 | 3 | 2 |
| flow properties | | 2 | 1 | 2 | 2 | 1 | 1 | 1 |
| | | slightly hazy | clear | opalescent, hazy | almost clear | clear | clear | clear |

|  |  | 14 | 15 | 16 | 17 | 18 | 19 | 20 | 21 | 22 |
|---|---|---|---|---|---|---|---|---|---|---|
| Component 1) | | | | | | | | | | |
| | long-oil linseed-oil alkyd, 60% in white spirit | 300.0 | 300.0 | 300.0 | 300.0 | 300.0 | 300.0 | 300.0 | 300.0 | 300.0 |
| | 3-amino-1-cyclohexyl-aminopropane | | | | | | | | | 2.88 |
| | 3,3'-dimethyl-4,4'-diaminodicyclohexylmethane | 4.5 | 4.5 | 4.5 | 4.5 | 4.5 | 4.5 | 4.5 | 4.5 | |
| | ethylglycol | 10.0 | 10.0 | 10.0 | 10.0 | 10.0 | 10.0 | 10.0 | 10.0 | |
| | aminopropanol | | | | | | | | | |
| | cyclohexylamine | | | | | | | | | 1.70 |
| | dicyclohexylamine | | | | | 3.12 | | | | |
| | eicosyl-/docosyl-amine mixture | 4.9 | | | | | | | | |
| | tetradecylamine | | | | 3.66 | | | | | |
| | oleylamine | | 4.6 | | | | | | | |
| | methylstearylamine | | | 4.85 | | | | | | |
| | methylcyclohexylamine | | | | | | 1.94 | | | |
| | dibutylamine | | | | | | | 2.21 | | |
| Component 2) | | | | | | | | | | |
| | tolylene diisocyanate | 4.7 | 4.7 | 4.7 | 4.7 | 4.7 | 4.7 | 4.7 | 4.7 | 4.7 |
| | white spirit | 20.0 | 20.0 | 20.0 | 20.0 | 20.0 | 20.0 | 20.0 | 20.0 | 20.0 |
| thixotropy | | 4 | 2 | 3 | 3 | 6 | 5 | 4 | 5 | 3 |
| viscosity | | 2 | 1 | 2 | 1 | 3 – 2 | 2 | 2 | 2 – 3 | 2 |
| flow properties | | 4 | 3 | 3 | 4 | 1 | 1 | 2 | 2 | 2 |
| | | slightly opalescent | almost clear | opalescent, hazy | hazy | slightly opalescent, hazy | slightly opalescent, hazy | clear | clear | opalescent, hazy |

Table 2

| Acid non-neutralised binders dilutable with water after neutralisation | | | | |
|---|---|---|---|---|
| | 23 | 24 | 25 | 26 |
| alkyd resin, drying by oxidation, 63 % in butylglycol | 300.0 | | | |
| autocrosslinking acrylic resin dilutable with water after neutralisation, 55 % in isobutanol | | 300.0 | | |
| autocrosslinking acrylic resin dilutable with water after neutralisation, 51 % in isobutanol | | | 300.0 | |
| linseed oil-wood oil epoxide ester, 70 % in ethylglycol, non-neutralised | | | | 300.0 |
| 3,3'-dimethyl-4,4'-diaminodicyclohexylmethane | 4.50 | 4.50 | 4.50 | 4.50 |
| cyclohexylamine | 1.70 | 1.70 | 1.70 | 1.70 |
| tolylene diisocyanate | 4.70 | 4.70 | 4.70 | 4.70 |
| ethylglycol acetate | | 5.0 | 5.0 | 5.0 |
| thixotrophy | 5 | 3 – 4 | 4 | 4 |
| viscosity | 2 | 1 | 2 | 2 |
| flow properties | 3 | 2 – 3 | 2 – 3 | 2 – 3 |
| | slightly opalescent hazy | slightly opalescent, hazy | clear | clear |

Table 3

| Component 1) | | 27 | 28 | 29 |
|---|---|---|---|---|
| | alkyd resin, 40 % ricinene oil, 29 % PSA, 55 % in a mixture of glycol ether and water | 300.0 | | |
| | autocrosslinking, thermosetting water-dilutable acrylic resin, 35 % in water | | 300.0 | |
| | linseed-oil-modified alkyd resin, 65 % linseed oil, 75 % in butylglycol | | | 300.0 |
| | 3,3'-dimethyl-4,4'-diaminodicyclohexyl methane | | 4.5 | 4.5 |
| | cyclohexylamine | | 1.7 | 1.7 |
| | dipropylene triamine | 2.0 | | |
| Component 2) | Component 2 slowly added with stirring to component 1 | | | |
| | ethylglycol acetate | 10.0 | 10.0 | 10.0 |
| | tolylene diisocyanate | 10.0 | 4.7 | 4.7 |
| thixotropy | | 2 | 3–4 | 4 |
| viscosity | | 2 | 1 | 2 – 3 |
| flow properties | | 2 | 2–3 | 2 – 3 |
| | | distinctly hazy | clear | slightly hazy |

EXAMPLE 1

In the following Example, the binder, diisocyanate and diamine used for thixotropizing binder are the same in each case, only the process conditions and other components used are varied.

The components used recurrently in the comparison tests are as follows:

binder: long-oil linseed-oil alkyd resin, 60% in white spirit (67% linseed oil, 23% phthalic acid anhydride), viscosity 190 to 240 cP, 50% in white spirit, diisocyanate: isomer mixture of 65% of tolylene-2,4-diisocyanate and 35% of tolylene-2,6-diisocyanate;

diamine: 3,3'-dimethyl-4,4'-diaminodicyclohexyl methane.

Two mixture components are initially prepared, one containing the reactive amino groups and, optionally, other isocyanate-reactive groups, whilst the other component contains the diisocyanate. The two components are then reacted in the manner specified in each case.

(a)

| Component 1 | | |
|---|---|---|
| 0.075 val | 20.0 g | of ethylglycol |
| 0.0272 val | 9.0 g | of diamine |
| | 3.4 g | of cyclohexylamine |
| | 600.0 g | of binder |
| | 632.4 g | |
| Component 2 | | |
| 0.1081 val | 9.4 g | of tolylene diisocyanate |
| | 40.0 g | of white spirit |
| | 49.4 g | |

Component 2 is slowly added with stirring to component 1 over a period of 2 to 3 minutes.

Properties:

The thixotropic binder obtained is clear and forms a homogeneous cuttable gel with invisibly pasty properties. Viscosity is only slightly increased in relation to the binder solution.

(b)

Whereas only a very small excess of isocyanate groups over the sum total of amino groups was used in (a), a considerable excess of isocyanate is used in the present case without any monoamine. The free isocyanate groups that are not arrested by urea formation react with the alcoholic hydroxyl groups present.

| Component 1 | | |
|---|---|---|
| | 600.0 g | of binder |
| | 30.0 g | of ethylglycol |
| 0.0834 val | 10.0 g | of diamine |
| | 640.0 g | |
| Component 2 | | |
| 0.149 val | 13.0 g | of tolylene diisocyanate |
| | 40.0 g | of white spirit |
| | 53.0 g | |

Component 2 is slowly added with stirring to component 1 over a period of about 2 minutes. The thixotropic binder formed in this case is not really pasty, but instead is mainly gel-like and thixotropic.

(c)

In this embodiment, the process that is particularly preferred in accordance with the invention is carried out by mixing both the reactants containing amino groups and also the diisocyanates before they are mixed with binder fractions. It can be of advantage to keep the quantity of binder used in admixture with the diisocyanate smaller than the quantity of binder used with the diamines and other reactive components. Quantitative ratios of from about ⅓ : ⅔ of the total binder used can be particularly suitable. In particular, inert solvent can also be used in the diisocyanate-containing binder mixture in order to obtain a certain diluting effect.

In this procedure, the amine-containing reaction component should be added to the mixture of diisocyanate and binder just after the diisocyanate is stirred into the binder. The reaction between amine components and isocyanate components is preferably carried out about 10 minutes and, optionally, up to about 30 minutes after isocyanate and binder have been mixed. Otherwise, undesirable reactions may occur between binder and diisocyanate, possibly resulting in gelatinisation of this component.

| Component 1 | | |
|---|---|---|
| 0.149 val | 200.0 g | of binder |
| | 13.0 g | of tolylene diisocyanate |
| | 40.0 g | of white spirit |
| | 253.0 g | |

Stir thoroughly and stir in component 2 slowly over a period of 5 minutes.

| Component 2 | | |
|---|---|---|
| 0.0834 val | 30.0 g | of ethylglycol |
| | 10.0 g | of diamine |
| | 400.0 g | of binder as above |
| | 440.0 g | |

Properties:

The binder thus prepared is very pasty, clear to slightly opalescent-hazy and, even when incorporated in a proportion of only 20% in a spreadable alkyd resin paint, prevents the paint from running when applied to vertical surfaces.

It can be seen particularly clearly from thixotropic binders produced by this process how it is possible to influence the properties of the end products by varying the components and the mixing sequence.

In cases where there is an excess of NCO-groups in relation to the $NH_2$-groups present, it is of advantage initially to introduce the isocyanate component into the binder together with an inert solvent. If diamine is added to this diisocyanate-containing mixture in the equivalent deficit, preferably in combination with the binder, the chains developed in the event of gradual addition are obviously not very long because NCO-groups are always present in excess. The monofunctional alcohol component should preferably be present in the binder-diamine mixture. Although subsequent addition is also possible, it should be made 5 to 10 minutes after the components have been mixed in order to prevent a crosslinking reaction between binder and the excess NCO-groups. Other factors which can influence the properties of the thixotropic binders during their preparation are:

1. The time taken to mix the individual components
2. The reactivity of the isocyanate and amine components.
3. The quota and reactivity of the monofunctional compounds used to shorten the urea chains.

EXAMPLE 2

Lacquers are prepared with the thixotropic binders produced in accordance with Example 1(a) to (c) under otherwise comparable conditions. The lacquer recipe is as follows:

| | |
|---|---|
| 30.0 g | of long-oil linseed-oil alkyd, 60 % in white spirit (67 % linseed oil, 23 % phthalic acid anhydride), viscosity: 190 to 240 cP, 50 % in white spirit |
| 0.3 g | of calcium naphthenate, 4 % Ca |
| 20.0 g | of titanium dioxide rutile (grind on 3-roll mill) |
| 32.0 g | of thixotropic binder |
| 82.3 g | |
| 0.3 g | of methylethyl ketoxime (anti-skin agent) |
| 1.2 g | of dry substance solution |
| 16.0 g | of white spirit for spreadability |
| 100.0 g | |

The paints are tested by dragging the stem of a paintbrush across a coating on a vertical surface with a diagonally extending groove on completion of application. The extent to which this groove is concealed by levelling of the paint is then observed. It is possible in this way to determine the anti-running effect of the thixotropized binder component.

Thixotropized binder according to Example 1(a):

The paint shows only a very slight tendency to run.

Thixotropized binder according to Example 1(b):

Although running down the vertical wall is largely prevented, the paint is not as easy to process as in the following test.

Thixotropized binder according to Example 1(c):

The paint is particularly easy to spread, inspite of which it does not show any signs of running down the vertical wall.

EXAMPLE 3

A thixotropized binder is prepared from components 1 and 2 in accordance with the following recipe:

| Component 1) | |
|---|---|
| 15.0 g | of ethylglycol |
| 5.0 g | of 3,3'-dimethyl-4,4'-diamino dicyclohexylmethane |
| 300.0 g | of long-oil linseed-oil alkyd, 60 % in white spirit, viscosity: 190 to 240 cP, 50 % in white spirit |
| | oil content: 63 %, phthalic acid anhydride content: 23 % |
| | stir thoroughly |

| Component 2) | |
|---|---|
| 6.5 g | of tolylene diisocyanate |
| | isomer mixture: 65 % of tolylene-2,4-diisocyanate 35 % of tolylene-2,6-diisocyanate |
| 20.0 g | of white spirit |
| 26.5 g | |

Component 2 is slowly added with stirring to component 1 over a period of 1 minute. After 30 minutes, a clear satisfactorily thixotropic binder is formed.

A white surface lacquer is prepared with this thixotropic material in accordance with the following recipe:

| | |
|---|---|
| 200.0 g | of long-oil linseed-oil alkyd, 60 % in white spirit viscosity: 190 to 240 cP, 50 % in white spirit oil content: 63 %, phthalic acid anhydride content: 23 % |
| 1.5 g | of calcium naphthenate, 4 % Ca |
| 1.8 g | of silicone oil, 2 % in xylene |
| 140.0 g | of titanium dioxide rutile |
| 10.0 g | of barium sulphate, precipitated |
| 353.3 g | |
| | grind once on a 3-roll stand |
| 0.7 g | of methylethyl ketoxime (anti-skin agent) stir thoroughly |
| 6.0 g | of dry substance solution |
| 140.0 g | of thixotropic alkyd resin according to the invention |
| 500.0 g | |

The paint thus obtained is subsequently diluted with white spirit until it is spreadable. The paint thus obtained is highly thixotropic and is easy to spread.

EXAMPLE 4

In this Example, a complete pigment-containing surface lacquer is thixotropized as a whole. The following procedure is adopted:

Component 1)

| | |
|---|---|
| 340.0 g | of long-oil linseed-oil alkyd, 60 % in white spirit viscosity: 190 – 240 cP, 50 % in white spirit oil content: 63 %, phthalic acid anhydride content: 23 % |
| 1.5 g | of calcium naphthenate, 4 % Ca |
| 1.8 g | of silicone oil, 2 % in xylene |
| 140.0 g | of titanium dioxide rutile |
| 10.0 g | of barium sulphate, precipitated |
| 493.3 g | |
| | grind once on a 3-roll mill |
| 0.7 g | of methylethyl ketoxime (anti-skin agent) stir thoroughly |
| 6.0 g | of dry substance solution |
| 500.0 g | |

Component 2)

| | |
|---|---|
| 7.5 g | of ethylglycol |
| 2.5 g | of 3,3'-dimethyl-4,4'-diaminodicyclohexyl methane |
| 10.0 g | | stir component 1 with component 2

Component 3)

| | |
|---|---|
| 3.6 g | of tolylene diisocyanate isomer mixture: 65 % of tolylene-2,4-diisocyanate 35 % of tolylene-2,6-diisocyanate |
| 10.0 g | of white spirit |
| 13.6 g | |

Component 3 is added slowly with stirring to the mixture of component 1 and component 2. After 24 hours, white spirit is added for spreadability. After 30 minutes to 1 hour, a highly thixotropic, spreadable paint is formed.

EXAMPLE 5

Binders and binder systems typical of the field of stoving lacquers are thixotropized in the following. Three binder components (binders 1 to 3) according to the invention are initially thixotropized:

Binder 1

Short-oil, non-drying alkyd resin, 60% in xylene oil content as triglyceride: 26%
phthalic acid anhydride content: approximately 49%
specific gravity at 20°C: 1.19 g/cc
acid number: 8
viscosity, 50% in xylene: 300–400 cP

Binder 2

Autocrosslinking thermosetting acrylate resin, 50% in butanol/xylene 1 : 1
acid number below 2
flow-out time from a DIN-cup 6 = 40–60 seconds (DIN 53211)

stoving temperature 30 minutes at 180°C
or 20 minutes at 190°C
or 10 minutes at 200°C

Binder 3

Crosslink-assisted acrylic resin, 50% in butanol/xylene 2 : 8. Binders 1 and 3 are used in combination with melamine resins, urea resin or autocrosslinking acrylic resins for stoving lacquers.

In Examples 5a to c, these binders are thixotropized with urea adducts obtained by reacting tolylene diisocyanate (isomer mixture of about 65% of tolylene-2,6-diisocyanate and 35% of tolylene-2,4-diisocyanate) and a monoamine/diamine mixture in the presence of the binder. Details are given in Table 4 below (where the Figures quoted are parts by weight).

Table 4

| Examples | 5a | 5b | 5c |
|---|---|---|---|
| Binder 1 | 300.0 | | |
| Binder 2 | | 300.0 | |
| Binder 3 | | | 300.0 |
| Component 1 | | | |
| butylamine 0.0137 val | 1.0 | 1.0 | 1.0 |
| xylylene diamine 0.05 val | 2.9 | 2.9 | 2.9 |
| Component 2 | | | |
| tolylene diisocyanate 0.0644 val | 5.6 | 5.6 | 5.6 |
| | 309.5 | 309.5 | 309.5 |
| Solids content | 51.6 % | 51.6 % | 51.6 % |

Component 1 is thoroughly mixed with the binder in each case. Component 2 is then gradually stirred into the mixture of binder and component 1. Heavily thixotropic to pasty binders are generally formed. Thixotropy is evident just after stirring. Thixotropy only reaches its final level after periods ranging from a few hours up to 1 day. If it is desired to produce systems that are particularly resistant to yellowing, it can be advisable to use aliphatic diisocyanates, for example hexamethylene diisocyanate, in equivalent quantities. Generally, it can be said that aliphatic components produce little or no yellowing, cycloaliphatic components can give rise to some yellowing, whilst aromatic components produce the most yellowing.

The thixotropized binders are then each worked up into a white lacquer. Binders 1 and 3 are processed with a melamine resin and pigment in accordance with the following basic recipe:

| Basic recipe | parts by weight |
|---|---|
| Binder | 41.0 |
| Melamine resin, 55 % in butanol/xylene | 16.5 |
| Titanium dioxide rutile | 30.5 |
| Ethylglycol | 12.0 |
| | 100.0 |

The white stoving lacquers produced with the above thixotropic binders were ground once on a one-roll stand, applied to sheet metal and, in an upright position, were stoved in an oven for 30 minutes at 150°C after an evaporation time of 5 minutes. The samples obtained did not show any signs of running, and the films were high-gloss and streak-free. After stoving, the colour was pure white. The dry layer thickness amounted to between 0.05 and 0.08 mm (single coating).

The thixotropic binder of Example 5b based on an autocrosslinking acrylic resin is mixed with the same, but non-thixotropized acrylic resin in a ratio of 1:1 (based on solids). This mixture is pigmented with 100% by weight of titanium dioxide rutile (based on binder). The paint thus obtained was applied in a thick layer to metal sheets and stoved upright for 30 minutes at 150°C. The lacquer films did not show any signs of running in a dry film thickness of 0.05 to 0.08 mm (single coating). Stoving did not produce any yellowing or reduction in gloss.

I claim:

1. A thixotropic coating agent comprising a binder and a thixotropizing agent, wherein the thixotropizing agent comprises a urea adduct obtained by reacting (a) a diisocyanate compound with (b) polyamine containing at least two amino groups which are primary or secondary amino groups, in the presence of the binder, using the diisocyanate compound in such quantities that, stoichiometrically, the amino groups do not outnumber the isocyanate groups to any appreciable extent.

2. A thixotropic coating agent as claimed in claim 1, wherein said reaction is carried out in the presence of at least one of monofunctional alcohols, monofunctional oximes, monofunctional amines, and alkanolamines.

3. A thixotropic coating agent as claimed in claim 1, wherein the thixotropizing agent is present in a quantity of from 0.05 to 10% by weight based on the coating agent.

4. A thixotropic coating agent as claimed in claim 2, wherein the polyamine has been reacted in a quantity of from 5 to 120 equivalent % of the amino groups, based on isocyanate groups, and wherein, with an excess of isocyanate groups over the amino groups of the polyamine, the monofunctional component or alkanolamine is used at least in a quantity equivalent to the still free isocyanate groups.

5. A thixotropic coating agent as claimed in claim 1, wherein the polyamine has been reacted in a quantity of from 5 to 120 equivalent % of the amino groups, based on isocyanate groups, and wherein, with an excess of isocyanate groups over the amino groups of the polyamine, the monofunctional component or alkanolamine is used at least in a quantity equivalent to the still free isocyanate groups.

6. A thixotropic coating agent as claimed in claim 5, wherein said equivalent % of the amino groups is 5 to 100.

7. A thixotropic coating agent as claimed in claim 5, wherein said equivalent % of the amino groups is 10 to 70.

8. A thixotropic coating agent as claimed in claim 1, wherein the polyamine includes diprimary amines.

9. A thixotropic coating agent as claimed in claim 8, wherein the polyamine includes polyamines containing more than two reactive amino groups in an equivalent amount up to about the amount of diprimary amine.

10. A thixotropic coating agent as claimed in claim 2, wherein said reaction is carried out in the presence of at least one of monofunctional amines and alkanolamines and free amino groups are not present in the coating agent in any appreciable number.

11. A thixotropic coating agent as claimed in claim 1, wherein the binder content is at least about 20% by weight based on the thixotropized material.

12. A thixotropic coating agent as claimed in claim 11, wherein the binder is at least 40% by weight.

13. A process for the production of thixotropic coating agents, wherein a liquid binder is mixed with polyamine containing at least two amino groups which are primary or secondary amino groups, and the resulting mixture is combined with a diisocyanate compound.

14. A process according to claim 13, wherein at least one of monofunctional alcohols, monofunctional oximes, monofunctional amines, and alkanolamines are mixed with the binder before said reaction.

15. A process according to claim 13, wherein the diisocyanate is mixed with binder before combining thereof with the mixture of binder and polyamine.

16. A process according to claim 15, wherein isocyanate groups are used in an excess over the amino groups of the polyamine of 0.3 to 0.7 amino groups to 1 isocyanate group and the mixture containing polyamines and binder is stirred into the mixture of diisocyanate and binder.

17. A process according to claim 13, wherein the reaction is carried out at temperatures in the range from room temperature to about 100°C.

18. A process according to claim 17, the temperature being room temperature to about 80°C.

19. A process according to claim 13 wherein binders which respond only weakly to thixotropizing are mixed with limited quantities of highly thixotropizable compatible binders.

20. A process according to claim 13, wherein the coating agent is mixed with other coating components.

21. A thixotropic coating agent as claimed in claim 1, wherein the binder is of the group long-oil, middle-oil, short-oil, and oil-free alkyd resin; stand-oil; linseed oil; linseed oil-stand oil combinations; urethane-, epoxy resin, acrylic resin- and styrene-modified alkyd resin; PVC-copolymers; cyclorubbers; oil-modified epoxidies; water-dilutable alkyd resins in non-neutralized form; unsaturated polyester resin; mixtures of unsaturated polyester resin with copolymerisable styrene; methacrylate; thermosetting aminoplast; autocrosslinking and crosslink-assisted acrylate resins; thermosetting alkyd and eposide resins.

22. A process according to claim 13, wherein the binder is of the group long-oil, middle-oil, short-oil, and oil-free alkyd resin; stand-oil; linseed oil; linseed oil-stand oil combinations; urethane-, epoxy resin, acrylic resin- and sytrene-modified alkyd resin; PVC-copolymers; cyclorubbers; oil-modified exposidies; water dilutable alkyd resins in non-neutralized form; unsaturated polyester resin; mixtures of unsaturated polyester resin with copolymerisable styrene; methacrylate; thermosetting aminoplast; autocrosslinking and crosslink-assisted acrylate resins; thermosetting alkyd and epoxide resins.

* * * * *